United States Patent
Fischer

(10) Patent No.: US 8,812,638 B2
(45) Date of Patent: Aug. 19, 2014

(54) METHOD, APPARATUS AND COMPUTER PROGRAM PRODUCT FOR CONTROLLING DEVICES

(75) Inventor: Jürgen Fischer, Backnang (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 996 days.

(21) Appl. No.: 12/373,427

(22) PCT Filed: Jul. 12, 2006

(86) PCT No.: PCT/EP2006/064161
§ 371 (c)(1),
(2), (4) Date: Jan. 30, 2009

(87) PCT Pub. No.: WO2008/006403
PCT Pub. Date: Jan. 17, 2008

(65) Prior Publication Data
US 2010/0005163 A1   Jan. 7, 2010

(51) Int. Cl.
G06F 15/173 (2006.01)
G06F 21/42 (2013.01)
G06F 21/31 (2013.01)
H04L 29/06 (2006.01)
H04W 88/02 (2009.01)

(52) U.S. Cl.
CPC .............. G06F 21/42 (2013.01); *G06F 21/31* (2013.01); *H04L 63/061* (2013.01); *H04W 88/02* (2013.01)
USPC ............... 709/223; 380/262; 380/270; 726/6; 726/14; 726/8; 726/9; 713/168; 713/161; 713/171; 713/185; 713/186; 455/411; 455/410

(58) Field of Classification Search
None
See application file for complete search history.

(56) References Cited

U.S. PATENT DOCUMENTS

| | | | |
|---|---|---|---|
| 5,896,499 A * | 4/1999 | McKelvey | 726/11 |
| 5,987,523 A | 11/1999 | Hind et al. | |
| 7,313,822 B2 * | 12/2007 | Ben-Itzhak | 726/24 |
| 2002/0032872 A1 * | 3/2002 | Jussy et al. | 713/201 |
| 2002/0184573 A1 * | 12/2002 | Rousseau et al. | 714/43 |
| 2004/0038710 A1 * | 2/2004 | Zechlin | 455/557 |

(Continued)

FOREIGN PATENT DOCUMENTS

| | | |
|---|---|---|
| CN | 1210308 A | 3/1999 |
| EP | 0878975 A2 | 11/1998 |
| WO | 2006/066277 A2 | 6/2006 |

OTHER PUBLICATIONS

Harrington, D. et al. "Data Filter MIB for SNMPv2." IETF Internet Draft, Aug. 1995. XP015028454.

(Continued)

*Primary Examiner* — Ian N Moore
*Assistant Examiner* — Dung B Huynh
(74) *Attorney, Agent, or Firm* — Coats & Bennett, PLLC

(57) ABSTRACT

A method of controlling an apparatus comprising a plurality of features and adapted to receive messages via a first network interface, wherein said method is implemented in a filter superposed on the top of an existing architecture of the apparatus. The method comprises the following steps: receiving network management message via said first network interface; interrogating said message in order to identify a feature said network management message relates to and filtering the received management message such that said management message is rejected if the identified feature is classified as disabled and said management message is allowed top go through if said feature is classified as enabled.

5 Claims, 2 Drawing Sheets

(56) References Cited

U.S. PATENT DOCUMENTS

| | | | |
|---|---|---|---|
| 2004/0148479 A1* | 7/2004 | Patel et al. | 711/163 |
| 2004/0260659 A1* | 12/2004 | Chan et al. | 705/400 |
| 2005/0120073 A1* | 6/2005 | Cho | 709/201 |
| 2005/0246545 A1* | 11/2005 | Reiner | 713/182 |
| 2006/0200590 A1* | 9/2006 | Pereira | 710/8 |
| 2006/0229772 A1* | 10/2006 | McClary | 701/3 |
| 2006/0252416 A1* | 11/2006 | Du et al. | 455/422.1 |

OTHER PUBLICATIONS

R. Woundy; Comcast; K. Marez; Motorola: "Cable Device Management Information Base for Data-Over-Cable Service Interface Specification Compliant Cable Modems and Cable Modem Termination Systems; draft-ietf-ipcdn-device-mibv2-11.txt", IETF Standard-Working-Draft, Internet Engineering Task Force, IETF, CH, vol. ipcdn, No. 11, Mar. 1, 2006, XP015043772, ISSN: 0000-0004.

* cited by examiner

METHOD, APPARATUS AND COMPUTER PROGRAM PRODUCT FOR CONTROLLING DEVICES

FIELD OF THE INVENTION

The present invention relates to controlling operation of devices, in general, and in particular to an apparatus, a computer program product and a method of controlling said apparatus by means of softkeys.

BACKGROUND OF THE INVENTION

Nowadays, when a device is designed it is usually made as a multifunctional unit. The concept of multifunctional device is especially visible in microprocessor controlled devices. There are known telecommunication devices that are designed to support several different transmission protocols or for example multifunctional devices that can perform different tasks (e.g. copying/printing/faxing . . . ). With this wealth of features the devices are desired by customers, but in many cases the price to be paid for such a universal device is too high. There are also known devices comprising many different features implemented (it can be made in form of software or hardware), but some of these features are disabled and the customer pays only for those enabled. The supplier of the device upon request from the customer can enable those disabled features by providing so called softkey to be input (or installed) in the device. The role of the softkey is to enable, or unlock, the feature requested. This approach allows for new business model where the multifunctional device is sold at a relatively low price and further payments are related to future operations of enabling of the features. The softkey in its simplest form is a code to be entered into the operation system of the device and if the code entered matches the one stored within the device the requested feature is enabled. Alternatively the softkey can be a software that must be executed in the device's environment in order to enable the requested feature.

In a very simplified way FIG. 1 depicts an architecture of a device 100 known in the art. The device is connected to a network element management unit 120 via a network connection. A network management message sent from the network element manager 120 is received by a management agent 104 of the device 100 and in response an appropriate action by one of software or hardware modules 102, 106 is carried out, wherein the action and the software or hardware module are determined by the network management message. In this device all software and hardware elements (and features associated with them) are available.

A disadvantage of the solutions known in the art is that the architecture of the device must be designed from the very beginning as one that supports control of features by means of softkeys. If the device was not designed in a way that application of softkeys is possible the architecture must be re-designed in order to implement this functionality. This is of course an expensive and time consuming process additionally complicated by the fact that in the present approach to product development different modules of the same device are developed by different teams or sometimes are purchased from a third party supplier. If the module is bought from the third party supplier only in an object code it can be implemented in the device, but it cannot be modified. It must also be appreciated that apart from the technical difficulties in modifying such third party modules it is also an intellectual property law issue related to copyright.

Hence, an improved control of a device by means of softkeys would be advantageous and in particular one that is independent of the existing architecture of the device.

SUMMARY OF THE INVENTION

Accordingly, the invention seeks to preferably mitigate, alleviate or eliminate one or more of the disadvantages mentioned above singly or in any combination.

According to a first aspect of the present invention there is provided a method of controlling an apparatus as defined in claim 1.

The method of controlling an apparatus comprising a plurality of features and adapted to receive messages via a first network interface according to the first aspect of the present invention comprises the step of receiving a network management message via said first network interface. In the following step the management message is interrogated in order to identify a feature said network management message relates to. The received management message is then filtered such that said management message is rejected if the identified feature is classified as disabled and said management message is allowed to go through if said feature is classified as enabled.

An apparatus according to a second aspect of the present invention comprises a plurality of features and a management agent adapted to control said features. The apparatus further comprises a first network interface for at least receiving a network management message, wherein said management agent comprises a filter adapted to interrogate the network management message in order to identify a feature said network management message relates to. The filter is also adapted to carry out filtering the received network management message such that said message is rejected if the identified feature is classified as disabled and said message is allowed to go through said filter if said feature is classified as enabled.

A computer program product stored on a computer readable medium according to a third aspect of the present invention is adapted to be executed on a computerised apparatus comprising a plurality of features and a first network interface. Said computer program product, when executed on said computerized apparatus, is adapted to receive a network management message via said first network interface and to interrogate said message in order to identify a feature said network management message relates to. The computer program product is further adapted to filter the received network management message such that said network management message is rejected if the identified feature is classified as disabled and said network management message is allowed to go through if said feature is classified as enabled.

Further features of the present invention are as claimed in the dependent claims.

The present invention beneficially allows for implementation of softkey control of a device without the need of modification of the existing architecture of the device as the module responsible for controlling the functionality by means of softkeys is architecture independent. Thanks to the use of the present invention it is possible to customise the device offered to the customer with only those features that are required by the customer and the remaining features disabled. As all the features are present in the device it is possible to activate those disabled ones later if the customer so requires. The main benefit is, however, that the mechanism of enabling/disabling of the features by means of softkeys is implemented on the top of the existing architecture and allows for such control even if the original architecture was not designed in a way that the softkey control is possible. The solution according to the present invention by employing a simple filtering mechanism does not introduce significant delay into operation of the device.

BRIEF DESCRIPTION OF THE DRAWINGS

The present invention will be understood and appreciated more fully from the following detailed description taken in conjunction with the drawings in which.

DESCRIPTION OF EMBODIMENTS OF THE INVENTION

The present invention is discussed herein below in the context of a method of controlling a communication apparatus. However, it should be understood that it is not limited to communication devices, but instead applies to any device that is connected to a communication or data network, whether fixed or mobile, wired or wireless and whether this apparatus can be used for communication purposes or is just operable to receive (and optionally transmit) data related to its operation.

The term "feature" whether in singular or plural form used in this description relates to a functionality of a device or a module of the device implemented in hardware or software.

Figure 1:
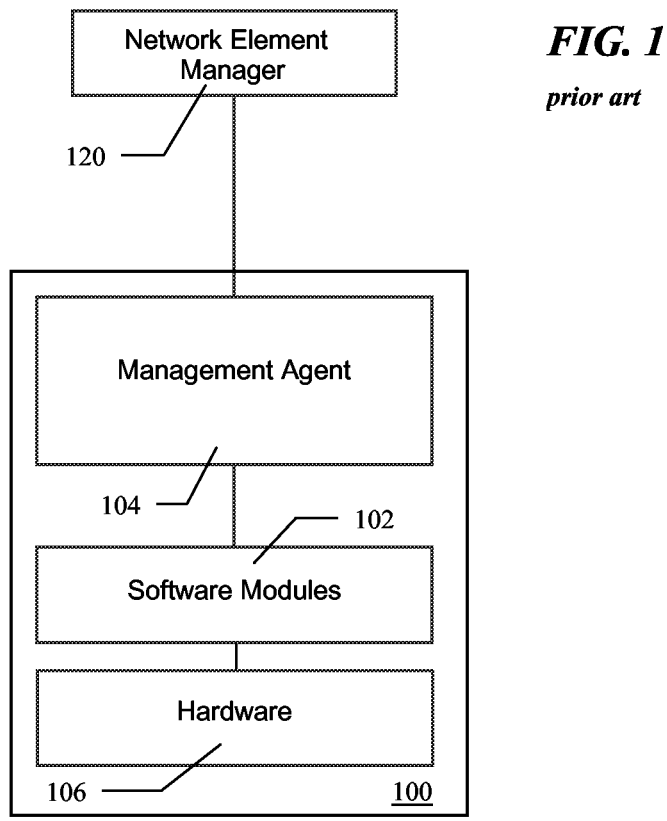
FIG. 1 is a diagram illustrating an apparatus known in the art.
Figure 2:
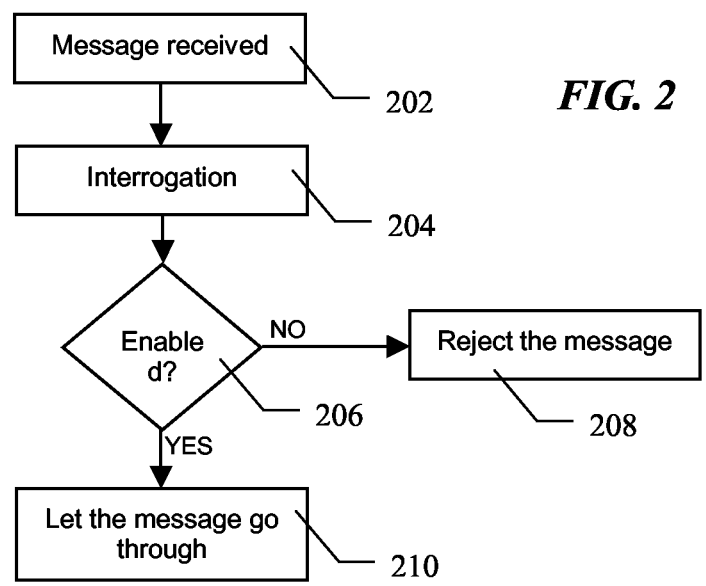
FIG. 2 is a diagram illustrating a method of controlling an apparatus in one embodiment of the present invention.
Figure 3:
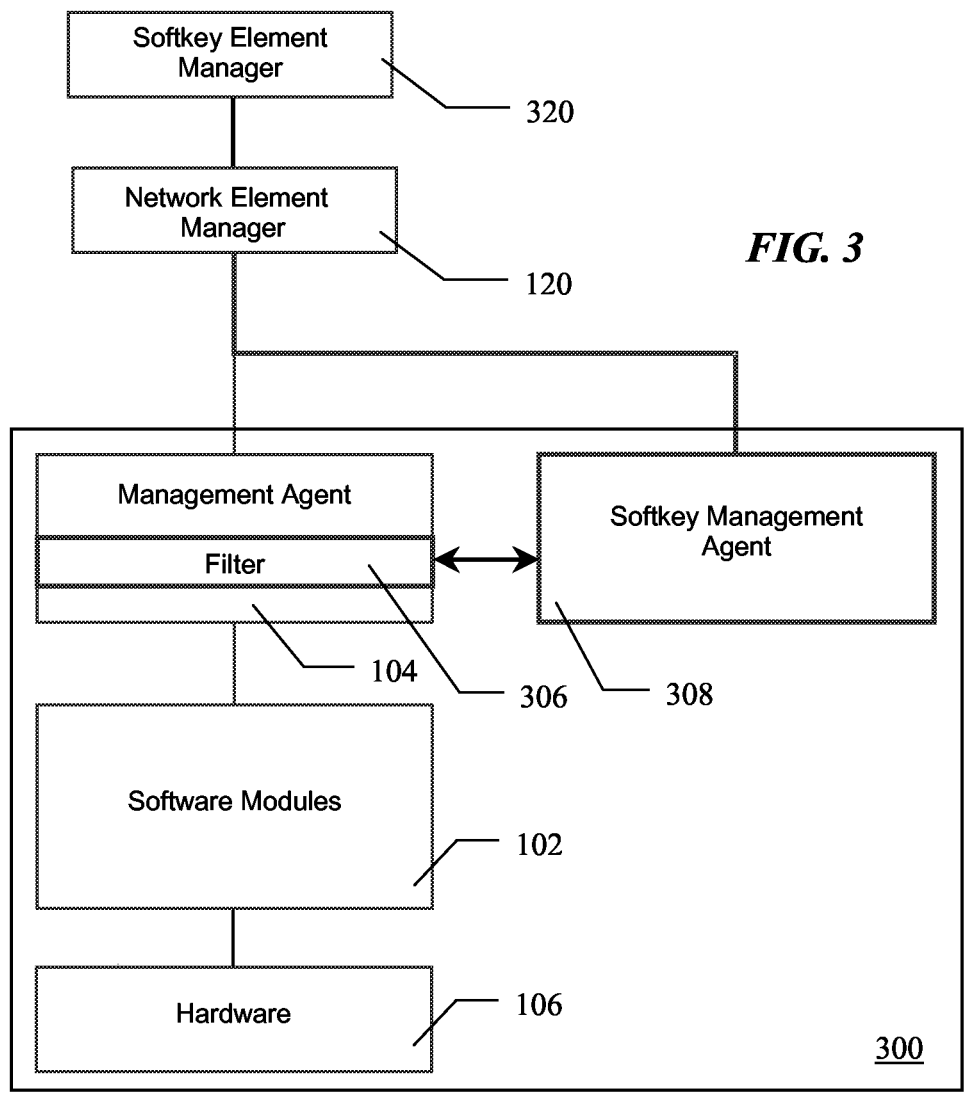
FIG. 3 is a diagram illustrating an apparatus in one embodiment of the present invention.

With reference to FIG. 2 and FIG. 3 a method of controlling operation of an apparatus is presented. For the sake of clarity the drawings present the invention in a very schematic way with elements and lines not essential for understanding the invention omitted.

In the presented embodiment the apparatus 300 is a communication device (e.g. a network node) that is operable to receive and transmit traffic in accordance with several different communications protocols. The different communications protocols are provided by different software and hardware modules 102 and 106.

The communications device 300 comprises a plurality of features 102, 106 (i.e. the software and hardware modules that make it possible that the communications device can operate in accordance with several communications protocols) and, which are controlled by a management agent 104, and said communications device is adapted to receive messages via a first network interface.

The method of controlling the operation of the communication device 300 comprises the steps of receiving, 202, a network management message via said first network interface followed by interrogation 204 of said network management message in order to identify a feature said network management message relates to. Since the communication device 300 can have a really big number of different features implemented, such as communications protocols, it may be that not all of them are enabled. This situation may happen, for example, when the supplier of the communications device 300 offers the device at a reduced price with only part of the features enabled and the remaining, blocked, features can be unblocked when the customer decides to buy these additional features. In the present invention the enabled/disabled status of a feature is maintained by a filter 306 that is superposed on the existing architecture of the communications device (namely on the management agent 104). The filter 306 performs the operation of filtering 206 the received network management messages such that a network management message is rejected 208 if the identified feature is classified as disabled and said network management message is allowed to go through 210 said filter 306 if said feature is classified as enabled. It means that network management messages related to the communications protocol that is disabled will not be processed as they will not reach their destination. The operation of controlling the device based on the disabled/enabled status, in one embodiment, is carried out entirely within the superposed part of the architecture. In alternative embodiments certain operations can be performed within the parts of the architecture of the device already present in the solutions known in the art. In order to implement the invention it is not necessary to re-work the architecture of the communications device 300. Analyzing the situation from the point of view of the communications device 300 the disabled/enabled status of its features is not visible to the device 300 because the superposed part takes over control of which messages are allowed to go through 210 said filter 306 and which are rejected 208. In effect the software, 102, and hardware, 106, modules operate like they would operate without the filter 306 (and accompanying softkey management agent 308) when no network management messages related to the particular disabled feature are sent to the device. The superposed elements (i.e. filter 306 and softkey management agent 308) of the device 300 prevents predefined messages from reaching the underlying software and hardware modules and certain features associated with these modules are not activated since the network management message that is supposed to initiate the module and associated feature never reach its destination. The filter 306 and softkey management agent 308, however, do not interfere with internal operation of the device and therefore this solution can be easily implemented in the majority of situations and devices without the need for reworking the architecture (software and hardware) of main functions of the device.

In the step of filtering 206 the filter 306 consults a database containing information on current status of a particular feature identified in the step of interrogation 204. As explained earlier the status can be either enabled or disabled. In one embodiment the database is a simple table with the feature ID and status, and the table is stored within the filter 306 or the softkey management agent 308. Alternatively the table is stored within the parts of the device already present in the solutions known in the art.

In one embodiment a softkey is sent by a softkey element manager 320 and received by said softkey management agent 308 via a second network interface. In alternative embodiment said softkey is received by said softkey management agent 308 via said first network interface and the filter 306. In the later embodiment the filter 306 is adapted to identify that the received message is (or contain) a softkey and to direct such message to the softkey management agent 308. The first and second network interfaces may use the same hardware.

The network element manager 120 and the softkey element manager 320 are both part of the network and not part of the device that is the subject matter of the present invention. The network element manager 120 generates and transmits management messages that control operation of the devices that are recipients of these messages. The softkey element manager 320 generates and transmits softkeys, which are destined for specific devices, although there may be softkeys addressed to all devices in the network, and the role of the softkey is to unlock (enable) the feature of the device that was disabled. In the context of the present invention the operation of unblocking contains changing entry(ies) in a table (database) used by the filter 306. Once the entry is changed to "enabled" the management messages directed to the feature associated with the changed entry will be allowed to go through the filter and will not be rejected. This approach allows for changing the status of said feature after receiving of the softkey. In one embodiment the change of status of a feature is performed entirely within a softkey management agent 308, which receives the softkey, and the database containing information on current status of said feature. In one embodiment, when the database is part of the filter the softkey management agent 308 controls the status of the filter by sending commands to the filter 306 to change status from disabled to enabled when a new valid softkey has been received and from enabled to disabled when, for example, a particular softkey expired. Alternatively, when the database is part of the softkey management agent 308 the change between disabled and enabled and vice versa are performed within the softkey management agent 308. Communication between the filter 306 and the softkey management agent 308 is limited to checking, by the filter, what is the value of a particular record within the database. Once the value is known the filter can either let the message go through or reject it.

The method of the invention may be implemented in a computer program product stored on a computer useable storage device for execution by a processor of the device 300. Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks.

The invention claimed is:

1. A method of controlling a device comprising a plurality of features and configured to receive communication messages via a first network interface, the method comprising the steps of:
   receiving a network management message via the first network interface, the network management message being associated with a feature;
   processing the network management message to identify the feature;
   filtering the received network management message by querying a database comprising information on a current status of the feature such that the network management message is rejected if the identified feature is classified as being disabled in the device, and allowed for processing to control the device if the feature is classified as enabled;
   receiving a softkey at a softkey management agent via a second network interface; and
   changing a status of the feature between disabled and enabled after receiving the softkey using only the softkey management agent and the database comprising the information on the current status of the feature, and controlling the change in status based on the softkey received at the device.

2. A device having a plurality of features, the device comprising:
   a first network interface configured to receive at least a network management message, wherein the network management message is associated with a feature of the device; and
   a database to store information on a current status of the feature;
   a management agent configured to control a plurality of features at the device, the management agent comprising a filter configured to:
      process the network management message to identify the feature associated with the network management message; and
      filter the network management message by querying a database comprising information on a current status of the feature such that the network management message is rejected if the identified feature is classified as disabled in the device, and allowed to pass through the filter to control the device if the feature is classified as enabled;
   a softkey management agent configured to change a status of the feature between disabled and enabled based on a softkey received at the device;
   wherein the softkey management agent comprises a second network interface and is configured to receive the softkey via the second network interface; and
   wherein the status change is performed entirely within the softkey management agent and the database comprising the information on the current status of the feature.

3. The device of claim 2 wherein the first and second network interfaces are implemented in a single hardware component.

4. A non-transitory, computer readable medium having logic stored thereon, the logic configured to execute on a computing device having a plurality of features and a first network interface, logic configured to control the device to:
   receive a network management message via the first network interface, wherein the network management message is associated with a feature of the computing device;
   process the network management message to identify the feature;
   query a database that stores information on a current status of the feature;
   use the stored information to filter the received network management message such that the network management message is rejected if the identified feature is classified as disabled, and allowed to pass through the filter for processing to control the device if said feature is classified as enabled;
   control a softkey management agent of the computing device to receive a softkey via a second network interface;
   change the status of the feature between disabled and enabled after receiving the softkey using only the softkey management agent and the database comprising the information on the current status of the feature.

5. The computer readable medium of claim 4 wherein the logic is further configured to control the softkey management agent and the filter to receive the softkey.

* * * * *